(12) United States Patent
Nimmer et al.

(10) Patent No.: US 11,049,678 B2
(45) Date of Patent: Jun. 29, 2021

(54) MAGNETIC FLOAT SWITCH

(71) Applicant: Metropolitan Industries, Inc., Romeoville, IL (US)

(72) Inventors: James Andrew Nimmer, Minooka, IL (US); Joseph Kenneth Burza, Lockport, IL (US)

(73) Assignee: Metropolitan Industries, Inc., Romeoville, IL (US)

(*) Notice: Subject to any disclaimer, the term of this patent is extended or adjusted under 35 U.S.C. 154(b) by 0 days.

(21) Appl. No.: 16/426,743

(22) Filed: May 30, 2019

(65) Prior Publication Data
US 2019/0371549 A1 Dec. 5, 2019

Related U.S. Application Data

(60) Provisional application No. 62/677,823, filed on May 30, 2018.

(51) Int. Cl.
*H01H 36/02* (2006.01)
*H01H 35/18* (2006.01)
*G01F 23/76* (2006.01)

(52) U.S. Cl.
CPC ............. *H01H 36/02* (2013.01); *G01F 23/76* (2013.01); *H01H 35/186* (2013.01)

(58) Field of Classification Search
CPC .... H01H 36/00; H01H 36/0006; H01H 36/02; H01H 36/0073; H01H 36/0013; H01H 35/18; H01H 35/186; G01F 23/64; G01F 23/72; G01F 23/76
See application file for complete search history.

(56) References Cited

U.S. PATENT DOCUMENTS

| | | | | |
|---|---|---|---|---|
| 4,644,117 A | * | 2/1987 | Grimes | H01H 35/186 200/61.52 |
| 5,552,774 A | * | 9/1996 | Gridley | G01F 23/38 340/623 |
| 9,318,286 B2 | * | 4/2016 | Devarajan | H01H 35/18 |
| 10,794,379 B2 | * | 10/2020 | Guetter | F04B 49/04 |

* cited by examiner

Primary Examiner — Vanessa Girardi
(74) Attorney, Agent, or Firm — Levenfeld Pearlstein, LLC

(57) ABSTRACT

A magnetic float switch is provided. The magnetic float switch can include a housing configured to float in a liquid, response circuitry located inside the housing, an internal chamber located inside the housing, a float state indicator housed within the internal chamber, and an actuating arm housed outside the internal chamber and coupled to the response circuitry. In operation, when a position of the housing changes so as to indicate an increasing level of the liquid, the float state indicator can move within the internal chamber from a first position to a second position to initiate a magnetic force between the float state indicator and the actuating arm so as to actuate the actuating arm from an inactive position to an active position. Then, when the actuating arm is in the active position, the response circuitry can initiate a response to the increasing level of the liquid.

20 Claims, 6 Drawing Sheets

MAGNETIC FLOAT SWITCH

CROSS REFERENCE TO RELATED APPLICATIONS

This application claims priority to U.S. Provisional Patent Application No. 62/677,823 filed May 30, 2018 and titled "MAGNETIC FLOAT SWITCH." U.S. Provisional Patent Application No. 62/677,823 is hereby fully incorporated by reference as if set forth fully herein.

FIELD

The present invention relates generally to a magnetic float switch.

BACKGROUND

Current float switch designs use a combination of a micro switch and a steel ball to trip a relay when the switch is floating at a certain height of liquid. However, because contact between the steel ball and the micro switch is typically required to activate the switch, repeated striking of the switch by the ball can lead to premature failures.

In view of the above, there is a continuing, ongoing need for improved systems and methods.

DETAILED DESCRIPTION

Figure 1:
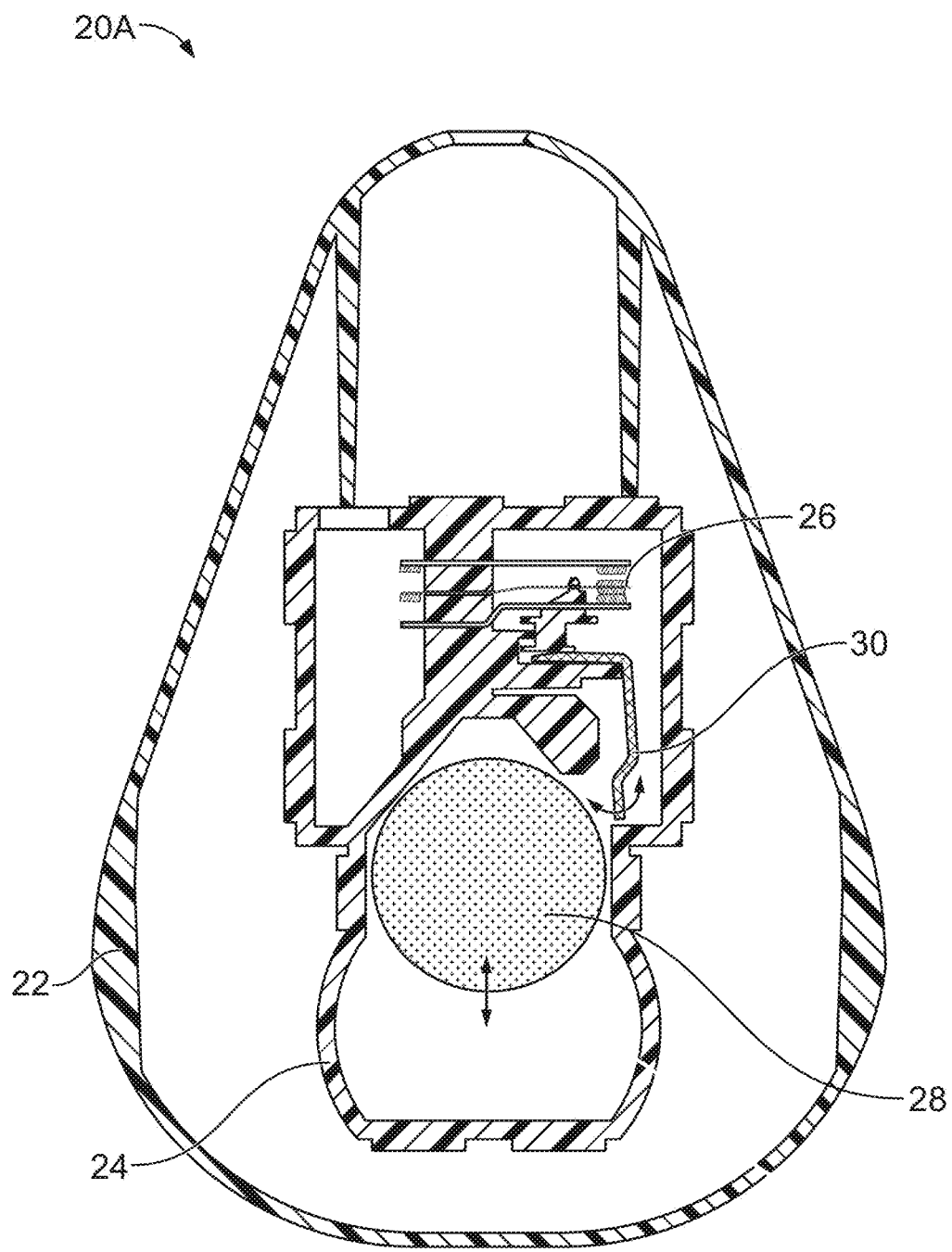
FIG. 1 illustrates a cross section view of a magnetic float switch having an actuator arm according to a first exemplary embodiment presented herein.

While this invention is susceptible of embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a magnetic float switch as shown schematically in FIGS. 1-4. The magnetic float switch can include a housing configured to float in a liquid as shown schematically in FIGS. 3-4, response circuitry located inside the housing, an internal chamber or tube located inside the housing, a float state indicator housed within the internal chamber, and an actuating arm housed outside the internal chamber and coupled to the response circuitry.

Various sizes and shapes for the float state indicator are contemplated. For example, in some embodiments, the float state indicator can include a ball or other shaped solid object that is configured to move within the internal chamber. Similarly, various sizes and shapes of the internal chamber are contemplated. For example, in some embodiments, the internal chamber can include a tapered portion or hour glass shape having a wider-diameter bottom which can allow for bigger water differential when compared to an internal chamber having a straight or cylindrical shape. In some embodiments, the interior chamber can be isolated from the response circuitry and can be sealed to prevent physical contact between the float state indicator and the actuating arm. In some embodiments, the response circuitry can include a relay that when tripped can activate a device such as, for example, a sump pump or other submergible pump connected thereto.

Figure 3:
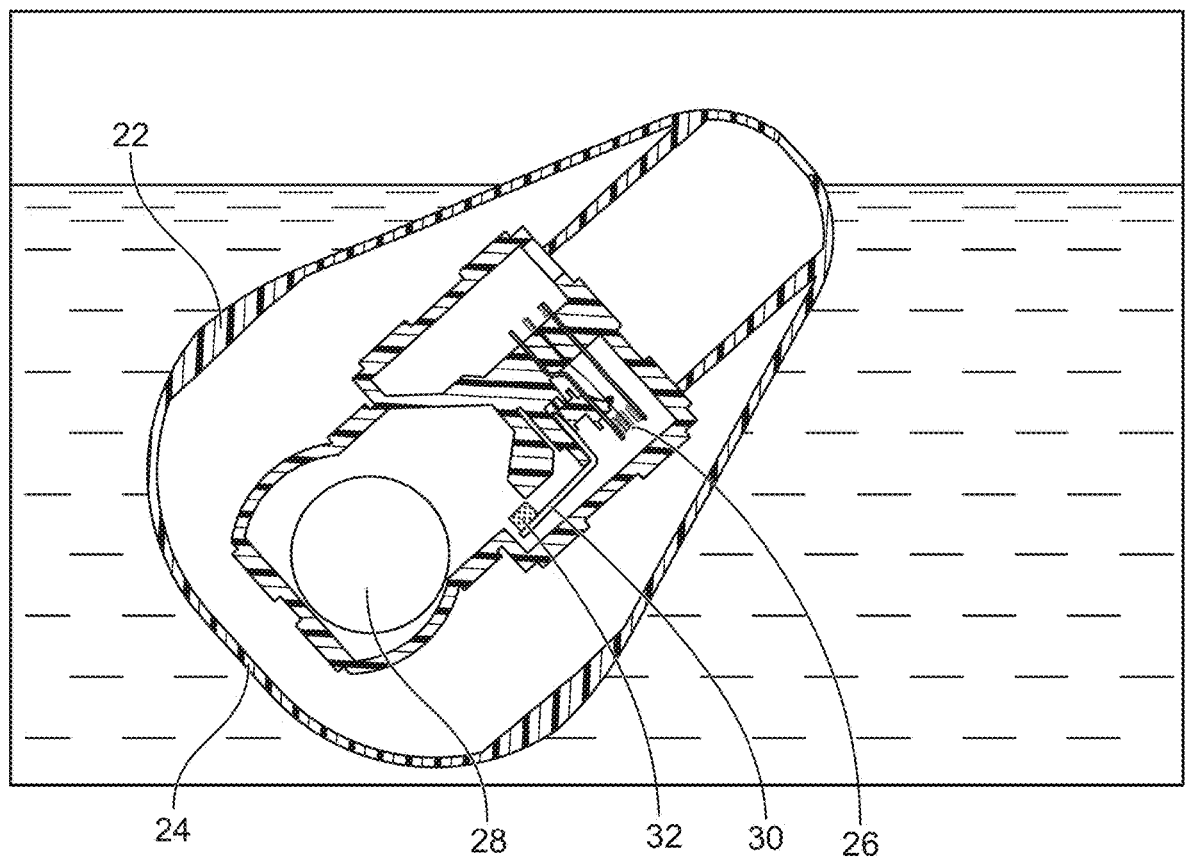
FIG. 3 is a partial section view of the magnetic float switch of FIG. 2 in a liquid according to an exemplary embodiment and FIG. 4 is a partial section view of a magnetic float switch of FIG. 2 in a liquid according to an exemplary embodiment and FIG. 5 is a detail view of the relay illustrated in FIG. 2 according to an exemplary embodiment.
Figure 4:
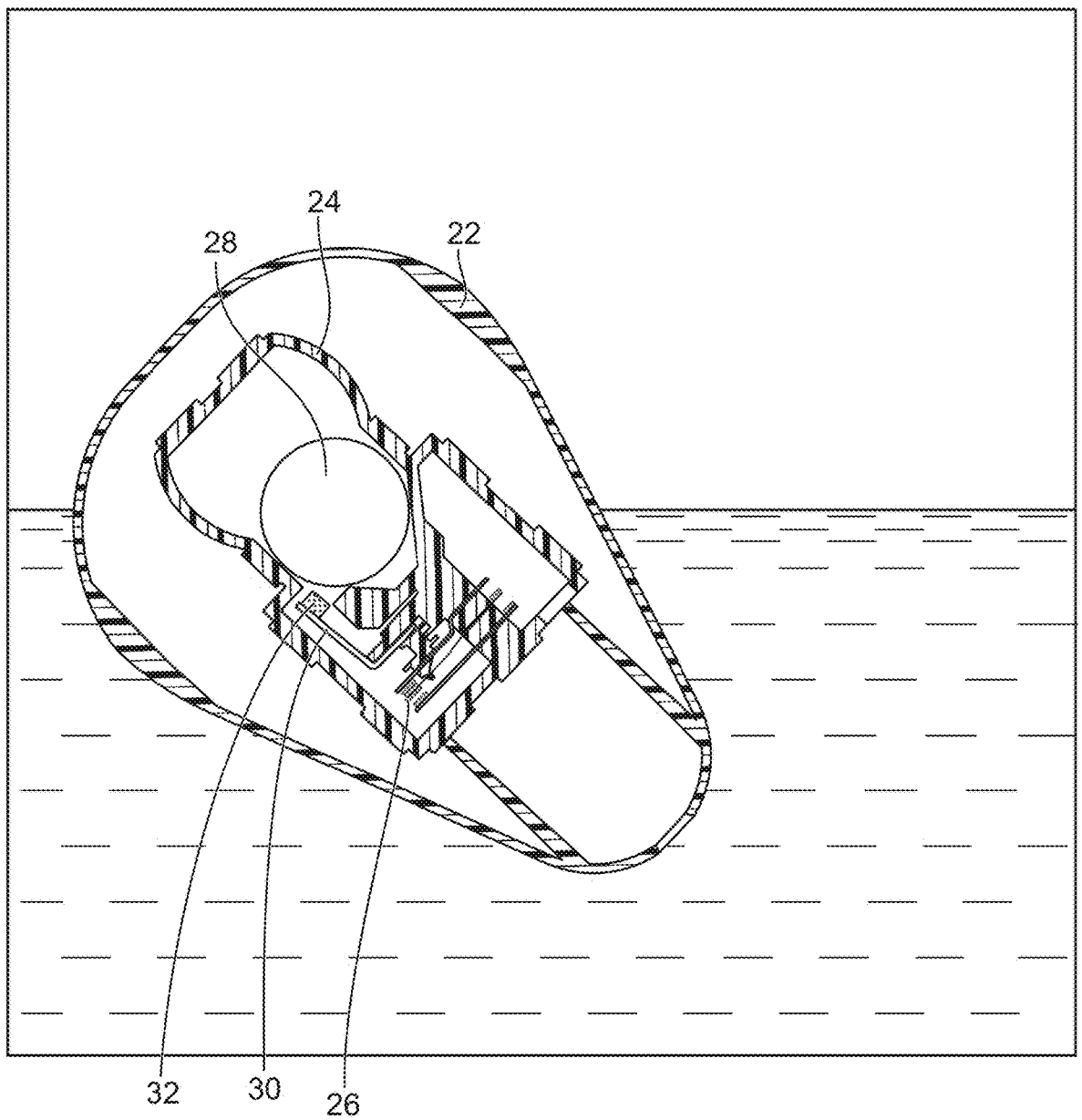
Figure 5:
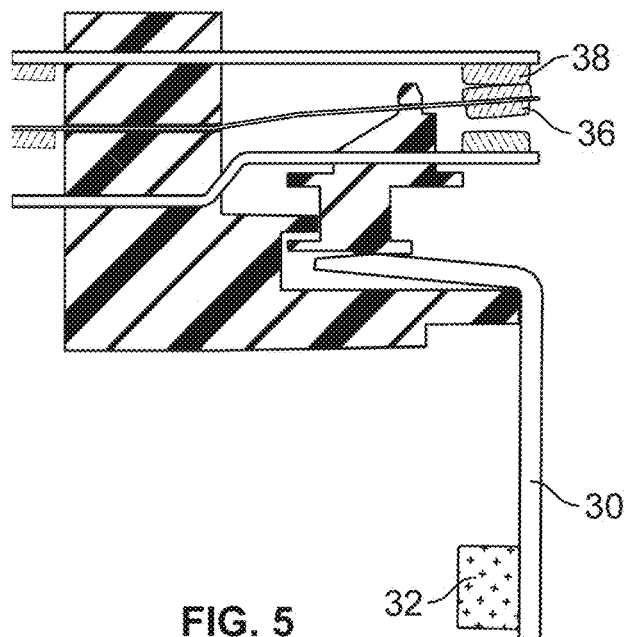
Figure 6:
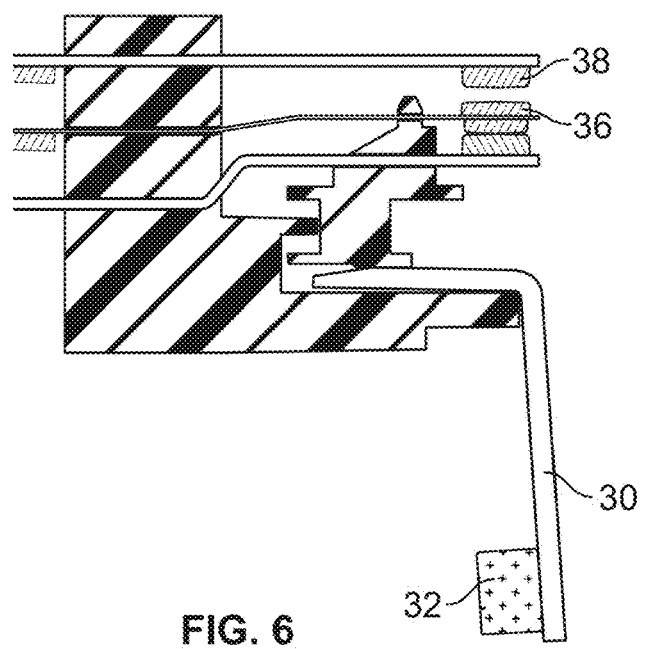
FIG. 6 is a detail view of the relay illustrated in FIG. 2 according to an exemplary embodiment.
Figure 7:
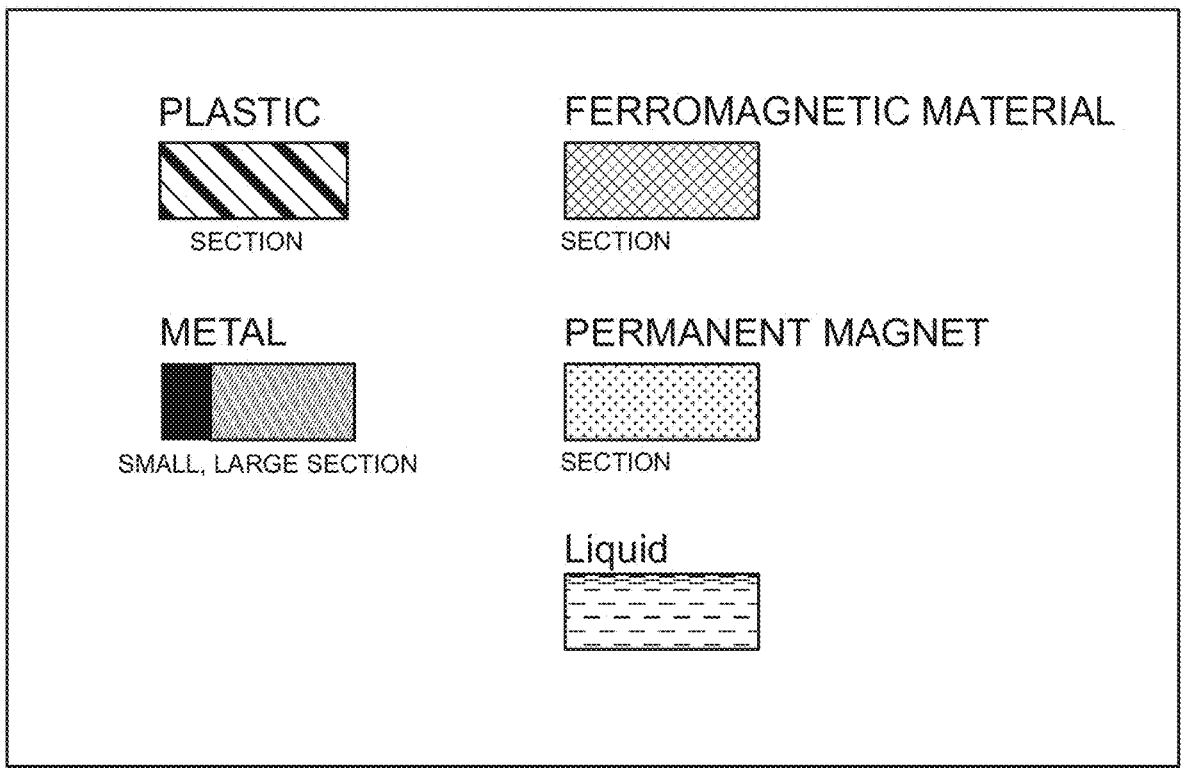
FIG. 7 is a legend for symbols illustrated in FIGS. 1-6.

In operation, when a position of the housing changes so as to indicate an increasing level of the liquid, the float state indicator can be configured to move within the internal chamber from a first position to a second position as shown schematically in FIGS. 3-4. The float state indicator moving to the second position can be further configured to initiate a magnetic force between the float state indicator and the actuating arm so as to actuate the actuating arm from an inactive position as shown in FIG. 6 to an active position as shown in FIG. 5. When the actuating arm is in the active position, the response circuitry can be configured to initiate a response to the increasing level of the liquid. Such response can include closing of a contact 36, 38 within the relay circuitry 26 as shown in FIG. 5 to facilitate the generation and/or transmission of an electrical signal to the associated device to indicate a condition relative the water level in the area of the float switch.

In some embodiments the magnetic force can be configured to attract the actuating arm towards the float state indicator so as to actuate the actuating arm from the inactive position to the active position. However, in other embodiments, the magnetic force can be configured to repel the actuating arm away from the float state indicator so as to actuate the actuating arm from the inactive position to the active position.

Various embodiments and combinations of metal and magnetic components are contemplated. For example, in some embodiments, the float state indicator can include a first permanent or natural magnet that produces a first magnetic field and the actuator arm can include a second permanent or natural magnet that produces a second magnetic field. In such embodiments, the float state indicator moving to the second position can be configured to cause the first magnetic field to interact with the second magnetic field to initiate the magnetic force between the float state indicator and the actuating arm. In other embodiments, the float state indicator can include a permanent or natural magnet that produces a magnetic field and the actuator arm can be constructed of a ferromagnetic material. In such embodiments, the float state indicator moving to the second position can be configured to cause the magnetic field to interact with the ferromagnetic material to initiate the magnetic force between the float state indicator and the actuating arm. In still other embodiments, the float state indicator can be constructed of a ferromagnetic material and the actuator arm can include a permanent or natural magnet that produces a magnetic field. In such embodiments, the float state indicator moving to the second position can be configured to cause the magnetic field to interact with the ferromagnetic material to initiate the magnetic force between the float state indicator and the actuating arm.

Various embodiments of response to the increasing level of the liquid are contemplated. For example, in some embodiments, the response circuitry can be configured to communicate to a control panel or user device that the increasing level of the liquid is increasing by transmitting a signal or stopping transmission of a signal when the actuating arm is in the active position. In other embodiments, the response can include tripping a relay to activate a device connected to the relay, for example, a sump pump or other submergible pump connected to the magnetic float switch.

FIG. 1 is cross section view of an exemplary magnetic float switch 20A in accordance with disclosed embodiments. According to such embodiments, the magnetic float switch 20A can include a housing 22, an internal chamber 24, a relay 26, and a ball 28 located inside the internal chamber 24. As shown schematically in FIGS. 1 and 6, the relay 26 can include an actuating arm 30. As shown in FIG. 1, the ball 28 can exert a magnetic force that can attract or repel the actuating arm 30. As shown schematically in FIGS. 3 and 4, in operation, the magnetic float switch 20A can be placed in a body or chamber of liquid such as a sump pit.

As shown in FIGS. 3 and 4, as liquid begins to rise, the float angle or position of the housing 22 can change which can cause the ball 28 to roll up the internal chamber 24 and exert a magnetic force with respect to the actuating arm 30. When the actuating arm 30 is pulled or pushed by the ball 28, the actuating arm 30 can trip the relay which can then activate a device such as, for example, a sump pump or other submergible pump connected thereto.

Figure 2:
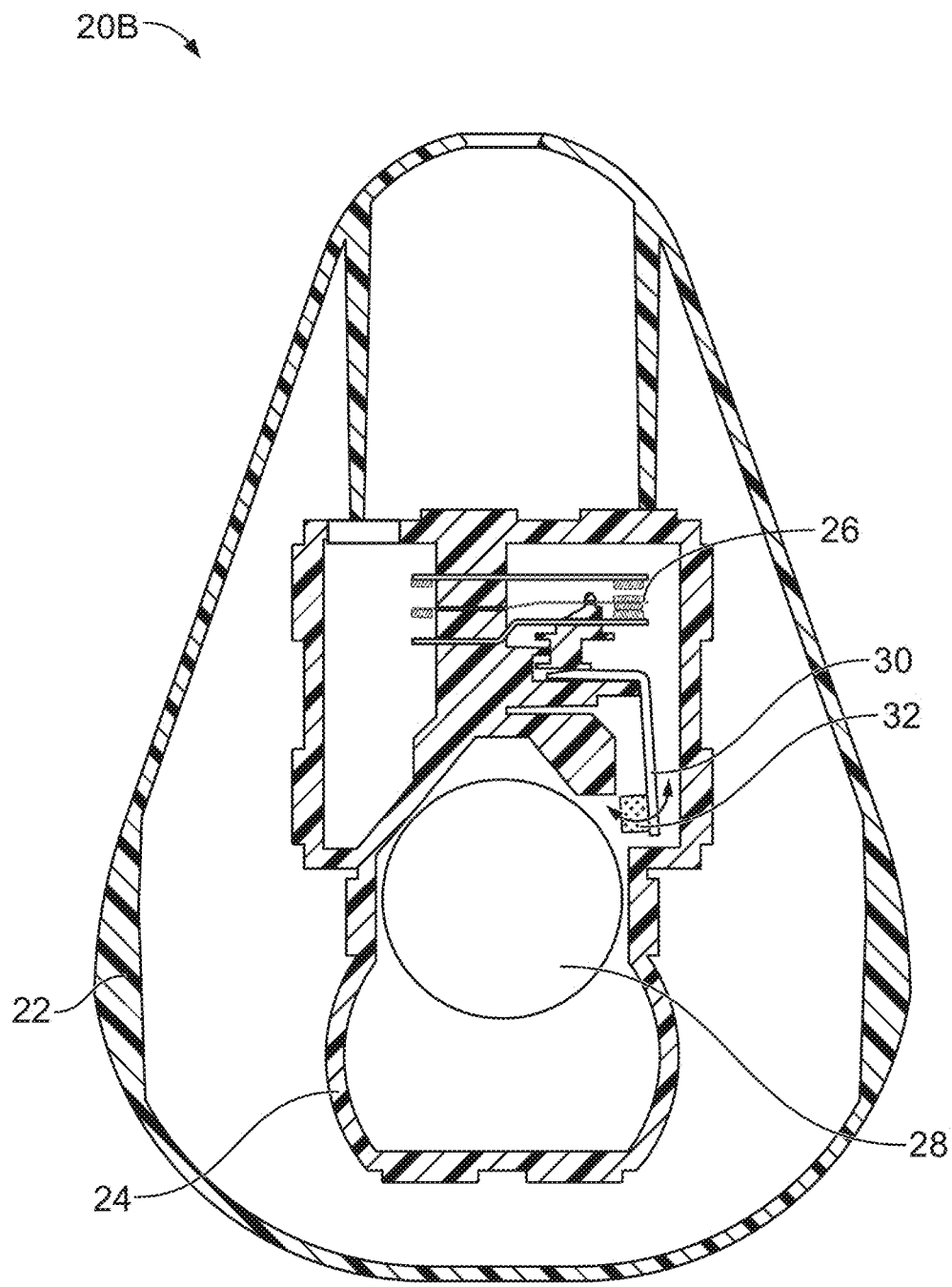
FIG. 2 illustrates a cross section view of a magnetic float switch having an actuator arm according to a second exemplary embodiment presented herein.

FIG. 2 is cross section view of a magnetic float switch 20B in accordance with disclosed embodiments. The magnetic float switch 20B is similar to the magnetic float switch 20A and can include housing 22, internal chamber 24, relay 26 as shown in FIG. 5, and ball 28 located inside the internal chamber 24. As shown in FIG. 2, the magnetic float switch 20B can differ from magnetic float switch 20A of FIG. 1 in that the actuating arm 30 in the embodiment as shown in FIG. 2 includes a magnet 32 that attracts or repels the ball 28. According to embodiments disclosed herein, the ball 28 can be a steel metal ball that is magnetically attracted to or repelled by the magnet 32. The ball 28 can also include a magnet with a polarity opposite or the same as the magnet 32.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A magnetic float switch comprising:
a housing configured to float in a liquid;
response circuitry located inside the housing;
an internal chamber located inside the housing;
a float state indicator housed within the internal chamber; and
an actuating arm housed outside the internal chamber and coupled to the response circuitry,
wherein, when a position of the housing changes so as to indicate an increasing level of the liquid, the float state indicator is configured to move within the internal chamber from a first position to a second position,
wherein, when the float state indicator is in the first position, the float state indicator is at a first distance away from the actuating arm so that a magnetic force between the float state indicator and the actuating arm is insufficient to actuate the actuating arm from an inactive position to an active position,
wherein, when the float state indicator is in the second position, the float state indicator is at a second distance away from the actuating arm so that the magnetic force between the float state indicator and the actuating arm is sufficient to actuate the actuating arm from the inactive position to the active position,
wherein, when the actuating arm is in the active position, the response circuitry is configured to initiate a response to the increasing level of the liquid.

2. The magnetic float switch of claim 1 wherein the magnetic force is configured to attract the actuating arm towards the float state indicator so as to actuate the actuating arm from the inactive position to the active position.

3. The magnetic float switch of claim 1 wherein the magnetic force is configured to repel the actuating arm away from the float state indicator so as to actuate the actuating arm from the inactive position to the active position.

4. The magnetic float switch of claim 1 wherein the response includes transmitting a signal to communicate the increasing level of the liquid through a relay included in the response circuitry when the actuating arm is in the active position.

5. The magnetic float switch of claim 1 wherein the response includes stopping transmission of a signal to communicate the increasing level of the liquid through a relay included in the response circuitry when the actuating arm is in the inactive position.

6. The magnetic float switch of claim 1 wherein the response circuitry includes a relay and the response includes tripping the relay when the actuating arm is in the active position.

7. The magnetic float switch of claim 1 wherein the float state indicator includes a first permanent magnet that produces a first magnetic field and the actuator arm includes a second permanent magnet that produces a second magnetic field, and
wherein the float state indicator moving to the second position is configured to cause the first magnetic field to interact with the second magnetic field to initiate the magnetic force between the float state indicator and the actuating arm.

8. The magnetic float switch of claim 1 wherein the float state indicator includes a permanent magnet that produces a magnetic field and the actuator arm is constructed of a ferromagnetic material, and
wherein the float state indicator moving to the second position is configured to cause the magnetic field to interact with the ferromagnetic material to initiate the magnetic force between the float state indicator and the actuating arm.

9. The magnetic float switch of claim 1 wherein the float state indicator is constructed of a ferromagnetic material and the actuator arm includes a permanent magnet that produces a magnetic field, and
wherein the float state indicator moving to the second position is configured to cause the magnetic field to interact with the ferromagnetic material to initiate the magnetic force between the float state indicator and the actuating arm.

10. The magnetic float switch of claim 1 wherein interior chamber is sealed to prevent physical contact between the float state indicator and the actuating arm.

11. A method comprising:
providing a housing that contains response circuitry, an internal chamber, a float state indicator housed within the internal chamber, and an actuating arm housed outside the internal chamber and coupled to the response circuitry, the housing being configured for being placed within a liquid;

when a position of the housing changes so as to indicate an increasing level of the liquid, the float state indicator moving within the internal chamber from a first position to a second position;

when the float state indicator is in the first position, the float state indicator is at a first distance away from the actuating arm so that a magnetic force between the float state indicator and the actuating arm is insufficient to actuate the actuating arm from an inactive position to an active position;

when the float state indicator is in the second position, the float state indicator is at a second distance away from the actuating arm so that the magnetic force between the float state indicator and the actuating arm is sufficient to actuate the actuating arm from the inactive position to the active position;

when the actuating arm is in the active position, the response circuitry initiating a response to the increasing level of the liquid.

12. The method of claim 11 further comprising:
the magnetic force attracting the actuating arm towards the float state indicator so as to actuate the actuating arm from the inactive position to the active position.

13. The method of claim 11 further comprising:
the magnetic force repelling the actuating arm away from the float state indicator so as to actuate the actuating arm from the inactive position to the active position.

14. The method of claim 11 wherein the response includes transmitting a signal to communicate the increasing level of the liquid through a relay included in the response circuitry when the actuating arm is in the active position.

15. The method of claim 11 wherein the response includes stopping transmission of a signal to communicate the increasing level of the liquid through a relay included in the response circuitry when the actuating arm is in the inactive position.

16. The magnetic float switch of claim 11 wherein the response circuitry includes a relay and the response includes tripping the relay when the actuating arm is in the active position.

17. The method of claim 11 wherein the float state indicator includes a first permanent magnet that produces a first magnetic field and the actuator arm includes a second permanent magnet that produces a second magnetic field, and wherein the float state indicator moving to the second position causes the first magnetic field to interact with the second magnetic field to initiate the magnetic force between the float state indicator and the actuating arm.

18. The method of claim 11 wherein the float state indicator includes a permanent magnet that produces a magnetic field and the actuator arm is constructed of a ferromagnetic material, and wherein the float state indicator moving to the second position causes the magnetic field to interact with the ferromagnetic material to initiate the magnetic force between the float state indicator and the actuating arm.

19. The method of claim 11 wherein the float state indicator is constructed of a ferromagnetic material and the actuator arm includes a permanent magnet that produces a magnetic field, and wherein the float state indicator moving to the second position causes the magnetic field to interact with the ferromagnetic material to initiate the magnetic force between the float state indicator and the actuating arm.

20. The method of claim 11 wherein interior chamber is sealed to prevent physical contact between the float state indicator and the actuating arm.

\* \* \* \* \*